United States Patent
He et al.

(10) Patent No.: US 12,255,806 B2
(45) Date of Patent: Mar. 18, 2025

(54) NETWORK DEVICE, CONTROL DEVICE AND METHODS THEREIN

(71) Applicant: Telefonaktiebolaget LM Ericsson (publ), Stockholm (SE)

(72) Inventors: Jiang He, Beijing (CN); Guoliang Gao, Beijing (CN); Michael Sien-Tsieh Chen, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 661 days.

(21) Appl. No.: 17/420,270

(22) PCT Filed: Jan. 11, 2019

(86) PCT No.: PCT/CN2019/071395
§ 371 (c)(1),
(2) Date: Jul. 1, 2021

(87) PCT Pub. No.: WO2020/143036
PCT Pub. Date: Jul. 16, 2020

(65) Prior Publication Data
US 2022/0094623 A1    Mar. 24, 2022

(51) Int. Cl.
*H04L 45/02* (2022.01)
*H04L 45/121* (2022.01)
*H04L 45/64* (2022.01)

(52) U.S. Cl.
CPC ............ *H04L 45/121* (2013.01); *H04L 45/02* (2013.01); *H04L 45/64* (2013.01)

(58) Field of Classification Search
CPC ....... H04L 45/02; H04L 45/121; H04L 45/64; H04L 47/35; H04W 28/021; H04W 28/0236
See application file for complete search history.

(56) References Cited

U.S. PATENT DOCUMENTS 8,121,128 B2 * 2/2012 Zhang ................... H04L 1/1867
370/235
9,338,096 B2 * 5/2016 Xu ........................... H04L 47/15
(Continued)

FOREIGN PATENT DOCUMENTS

CN      105933184 A     9/2016
CN      107547393 A     1/2018
(Continued)

OTHER PUBLICATIONS

Author Unknown, "IEEE Standard for Local metropolitan area networks—Station and Media Access Control Connectivity Discovery," IEEE Computer Society, IEEE Std 802.1AB, Mar. 11, 2016, 146 pages.
(Continued)

*Primary Examiner* — Alpus Hsu
(74) *Attorney, Agent, or Firm* — Withrow & Terranova, PLLC (57) ABSTRACT

The present disclosure provides a method in a network device. The method includes: determining a node delay associated with the network device and/or a link delay associated with a link between the network device and a neighboring network device; and transmitting to the neighboring network device a Link Layer Discovery Protocol Data Unit, LLDPDU, containing the node delay and/or the link delay.

11 Claims, 5 Drawing Sheets

(56) References Cited

U.S. PATENT DOCUMENTS

| | | | |
|---|---|---|---|
| 9,560,684 B2* | 1/2017 | Sivanesan | H04W 76/18 |
| 9,888,513 B2* | 2/2018 | Iyer | H04W 28/08 |
| 9,929,829 B1 | 3/2018 | Huang et al. | |
| 9,949,194 B2* | 4/2018 | Zhao | H04W 24/10 |
| 9,954,789 B2* | 4/2018 | Basu Mallick | H04L 47/32 |
| 10,050,894 B2* | 8/2018 | Karaki | H04L 69/322 |
| 10,694,446 B2* | 6/2020 | Jung | H04W 40/12 |
| 2006/0050635 A1 | 3/2006 | Yamada et al. | |
| 2017/0041961 A1* | 2/2017 | Zou | H04L 47/27 |
| 2018/0270144 A1 | 9/2018 | Jiang et al. | |
| 2019/0007328 A1* | 1/2019 | Karaki | H04L 47/34 |
| 2019/0045304 A1* | 2/2019 | Bhalla | H04R 3/12 |
| 2019/0190635 A1* | 6/2019 | Goel | H04J 3/0667 |
| 2019/0222442 A1* | 7/2019 | Wei | H04L 43/026 |
| 2020/0099568 A1* | 3/2020 | Baheri | H04L 41/0213 |
| 2021/0204172 A1* | 7/2021 | Rost | H04W 28/0268 |

FOREIGN PATENT DOCUMENTS

| | | |
|---|---|---|
| EP | 2677690 A1 | 12/2013 |
| WO | 2016180915 A1 | 11/2016 |
| WO | 2018000859 A1 | 1/2018 |

OTHER PUBLICATIONS

International Search Report and Written Opinion for International Patent Application No. PCT/CN2019/071395, mailed Oct. 8, 2019, 10 pages.

Extended European Search Report for European Patent Application No. 19909415.2, mailed Jun. 27, 2022, 18 pages.

* cited by examiner

NETWORK DEVICE, CONTROL DEVICE AND METHODS THEREIN

This application is a 35 U.S.C. § 371 national phase filing of International Application No. PCT/CN2019/071395, filed Jan. 11, 2019, the disclosure of which is incorporated herein by reference in its entirety.

TECHNICAL FIELD

The present disclosure relates to communication technology, and more particularly, to a network device, a control device and methods therein.

BACKGROUND

In the $5^{th}$ Generation (5G) networks, more applications are delay sensitive. These applications require network paths to be calculated such that delay requirements can be satisfied.

Typically, Ethernet-based networks, such as Radio Access Networks (RANs) and Metro Ethernet networks have no mechanism to report network delay information. Without such information, it may not be possible to calculate or establish paths that can satisfy delay requirements of delay sensitive applications.

SUMMARY

It is an object of the present disclosure to provide a network device, a control device and methods therein, capable of advertising delay information or utilizing the delay information in path calculation in e.g., an Ethernet-based network.

According to a first aspect of the present disclosure, a method in a network device is provided. The method includes: determining a node delay associated with the network device and/or a link delay associated with a link between the network device and a neighboring network device; and transmitting to the neighboring network device a Link Layer Discovery Protocol Data Unit (LLDPDU) containing the node delay and/or the link delay.

In an embodiment, the operation of determining the link delay may include measuring the link delay as a unidirectional delay from the network device to the neighboring network device, a unidirectional delay from the neighboring network device to the network device, or a bidirectional delay between the network device and the neighboring network device.

In an embodiment, the link delay may be measured using Precision Time Protocol (PTP).

In an embodiment, the LLDPDU may include a first Type-Length-Value (TLV) indicating the node delay and/or a second TLV indicating the link delay.

In an embodiment, the first TLV may include a type or subtype field indicating that the first TLV is for node delay advertisement and a value field indicating a numerical value of the node delay, and/or the second TLV may include a type or subtype field indicating that the second TLV is for link delay advertisement and a value field indicating a numerical value of the link delay.

In an embodiment, each of the first TLV and the second TLV may further include a unit field indicating a time unit of the numerical value in its value field.

In an embodiment, the network device and the neighboring network device may operate based on Ethernet.

In an embodiment, the method may further include: storing the node delay and/or the link delay in an LLDP database at the network device; and transmitting information on the node delay and/or the link delay to a control device.

In an embodiment, the method may further include: receiving from another neighboring network device another LLDPDU containing another node delay associated with the other neighboring network and/or another link delay associated with a link between the network device and the other neighboring network device; storing the other node delay and/or the other link delay in the LLDP database; and transmitting information on the other node delay and/or the other link delay to the control device.

In an embodiment, the control device may host a Network Management System (NMS) and the information on the node delay and/or the link delay and/or the information on the other node delay and/or the other link delay may be transmitted to the control device in response to a query based on Simple Network Management Protocol (SNMP) or NETwork CONFiguration (NETCONF).

In an embodiment, the method may further include: receiving from a control device a packet to be forwarded to the neighboring network device, the first packet having an embedded LLDPDU; and adding the node delay and/or the link delay to the embedded LLDPDU to form the LLDPDU.

In an embodiment, the packet may be an OpenFlow packet.

In an embodiment, the control device may host a Software-Defined Networking (SDN) controller.

According to a second aspect of the present disclosure, a network device is provided. The network device includes a communication interface, a processor and a memory. The memory contains instructions executable by the processor whereby the network device is operative to perform the method according to the above first aspect.

According to a third aspect of the present disclosure, a computer readable storage medium is provided. The computer readable storage medium has computer program instructions stored thereon. The computer program instructions, when executed by a processor in a network device, cause the network device to perform the method according to the above first aspect.

According to a fourth aspect of the present disclosure, a method in a control device of a network is provided. The network includes a plurality of network devices. The method includes: retrieving from a Link Layer Discovery Protocol (LLDP) database in each of the plurality of network devices: topology information associated with that network device and one or more neighboring network devices of that network device, and delay information indicating a node delay associated with that network device and/or link delays associated with respective links between that network device and the one or more neighboring network devices. The method further includes: calculating a path through the network based on the topology information and the delay information retrieved from each of the plurality of network devices.

In an embodiment, the path may be calculated such that it satisfies a delay requirement.

In an embodiment, the control device may host a Network Management System (NMS) and the topology information and the delay information may be retrieved from each of the plurality of network devices based on Simple Network Management Protocol (SNMP) or NETwork CONFiguration (NETCONF).

In an embodiment, the network may operate based on Ethernet.

According to a fifth aspect of the present disclosure, a method in a control device of a network is provided. The network includes a plurality of network devices. The method includes: for each of the plurality of network devices: transmitting to that network device a first packet to be forwarded to its neighboring network device, the first packet having an embedded Link Layer Discovery Protocol Data Unit (LLDPDU); and receiving from the neighboring network device a second packet including topology information associated with that network device and the neighboring network device and further including the embedded LLDPDU having delay information indicating a node delay associated with that network device and/or a link delay associated with a link between that network device and the neighboring network device; and calculating a path through the network based on the topology information and the delay information from each of the plurality of network devices.

In an embodiment, the path may be calculated such that it satisfies a delay requirement.

In an embodiment, the control device may host a Software-Defined Networking (SDN) controller.

In an embodiment, the network may operate based on Ethernet.

According to a sixth aspect of the present disclosure, a control device is provided. The control device includes a communication interface, a processor and a memory. The memory contains instructions executable by the processor whereby the control device is operative to perform the method according to the above fourth or fifth aspect.

According to a seventh aspect of the present disclosure, a computer readable storage medium is provided. The computer readable storage medium has computer program instructions stored thereon. The computer program instructions, when executed by a processor in a control device, cause the control device to perform the method according to the above fourth or fifth aspect.

With the embodiments of the present disclosure, delay information, including a node delay and/or a link delay, can be advertised using an LLDPDU in e.g., an Ethernet-based network. With this delay information, a control device can calculate or establish a path through the network that can satisfy a delay requirement.

BRIEF DESCRIPTION OF THE DRAWINGS

The above and other objects, features and advantages will be more apparent from the following description of embodiments with reference to the figures, in which.

DETAILED DESCRIPTION

In the following, references in the specification to "one embodiment", "an embodiment", "an example embodiment" and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Link Layer Discovery Protocol (LLDP) is a link layer protocol used by network devices for advertising their identities to their direct neighbors (i.e., in one hop) on an Institute of Electrical and Electronic Engineers (IEEE) 802 Local Area Network (LAN). Information collected using the LLDP is stored in an LLDP database of a network device, e.g., in a Management Information Base (MIB) or YANG module database, and can be retrieved by a control device using Simple Network Management Protocol (SNMP) or NETwork CONFiguration (NETCONF).

Figure 1:
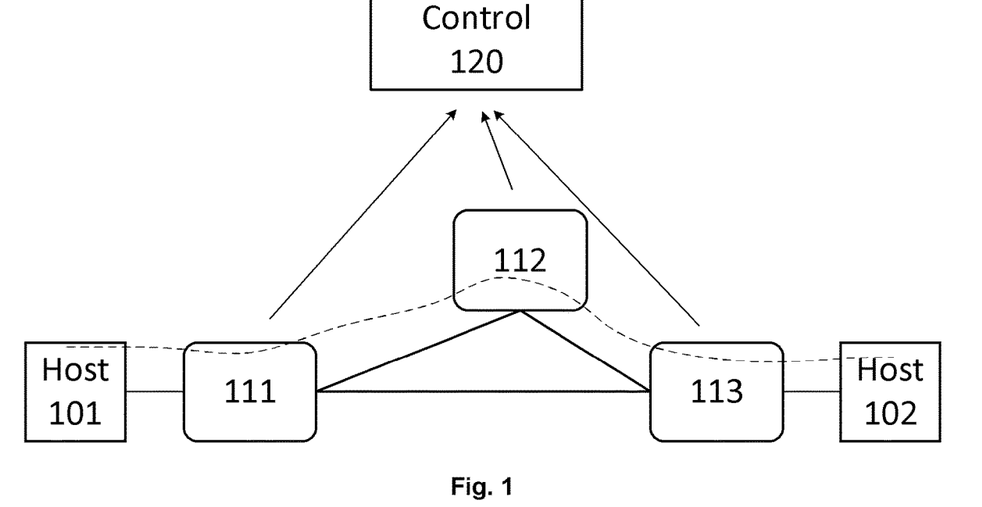
FIG. 1 is a schematic diagram showing an example network scenario in which the present disclosure can be applied.

FIG. 1 shows an example network scenario in which the present disclosure can be applied. As shown in FIG. 1, a network, which can be an Ethernet-based network, includes three network devices (or referred to as "nodes") 111, 112 and 113 (each can be e.g., a switch or a router). The network devices 111, 112 and 113 use LLDP to discover their respective neighbors. For example, the network device 111 receives an LLDP Data Unit (LLDPDU) from the network device 112 via its Port #1 and an LLDPDU from the network device 113 via its Port #2, and stores the identities of the network devices 112 and 113 in its LLDP database in association with Ports #1 and #2, respectively. Similarly, when the network device 112 receives LLDPDUs from the network devices 111 and 113, respectively, it stores their identities in its LLDP database in association with respective ports via which the LLDPDUs are received. A control device 120, which hosts a Network Management System (NMS), can learn the topology of the network by retrieving information from the LLDP databases in the network devices 111, 112 and 113. When a path is to be established from a host 101 (which can be a base station in a RAN scenario) connected to the network device 111 to a host 102 connected to the network device 113, the control device 120 can calculate the path, e.g., the one shown as a dashed line in FIG. 1, based on the topology of the network. Then, the control device 120 can establish the path by configuring Medium Access Control (MAC) table entries in the network devices 111, 112 and 113 accordingly.

Figure 2:
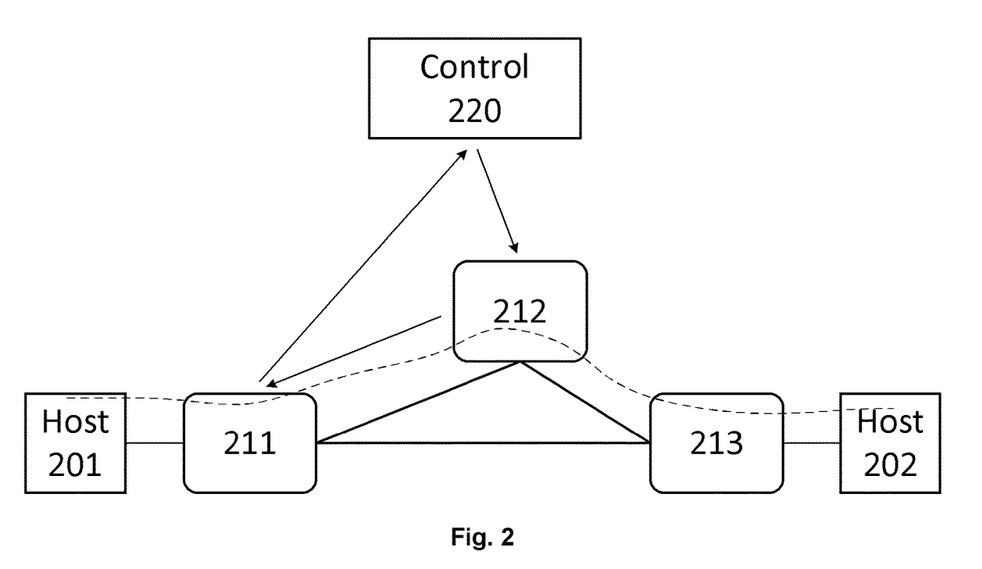
FIG. 2 is a schematic diagram showing another example network scenario in which the present disclosure can be applied.

Typically, LLDP packets are generated and terminated at network devices as described above. However, for a Software-Defined Networking (SDN) controller such as OpenDaylight or Open Network Operating System (ONOS), LLDP packets can be generated and terminated at the controller itself. FIG. 2 shows an SDN scenario in which the present disclosure can be applied. As shown in FIG. 2, a network, which can be an Ethernet-based network, includes three network devices 211, 212 and 213. Initially, a control device 220, which hosts an SDN controller, receives from the network devices 211, 212 and 213 information on their identities and ports. In order to learn the topology of the network, the control device 220 can send packets, e.g., OpenFlow packets, each having an embedded LLDPDU, to the network devices 211, 212 and 213. For example, the control device 220 can send an OpenFlow packet to the network device 212. The OpenFlow packet has an embedded LLDPDU and contains information that instructs the network device 212 to forward the packet via its Port #1. Upon receiving the packet, the network device 212 extracts the embedded LLDPDU and sends it via its Port #1. Assuming that Port #1 of the network device 212 is connected to Port #1 of the network device 211, the network device 211 receives the LLDPDU via its Port #1 and sends an OpenFlow packet, having the LLDPDU embedded and containing information on Port #1 via which the LLDPDU is received, to the control device 220. When receiving the OpenFlow packet from the network device 211, the control device 220 knows that Port #1 of the network device 212 is connected to Port #1 of the network device 211. In this way, by instructing each of the network devices 211, 212 and 213 to forward an LLDPDU via each of its ports and receiving, from the network device that receives the forwarded LLDPDU, information on the port via which the forwarded LLDPDU is received, the control device 220 can learn the topology of the network. When a path is to be established from a host 201 connected to the network device 211 to a host 202 connected to the network device 213, the control device 220 can calculate the path, e.g., the one shown as a dashed line in FIG. 2, based on the topology of the network. Then, the control device 220 can establish the path by configuring flow table entries in the network devices 211, 212 and 213 accordingly.

Figure 3:
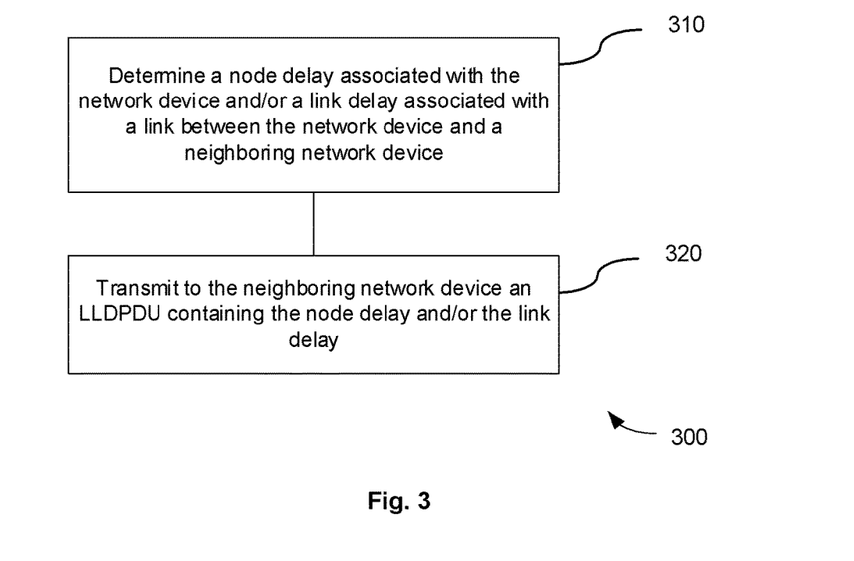
FIG. 3 is a flowchart illustrating a method in a network device according to an embodiment of the present disclosure.

FIG. 3 is a flowchart illustrating a method 300 according to an embodiment of the present disclosure. The method 300 can be performed at a network device, e.g., the network device 111, 112 or 113 in FIG. 1 or the network device 211, 212 or 213 in FIG. 2. The network device may operate in an Ethernet-based network.

At block 310, a node delay associated with the network device and/or a link delay associated with a link between the network device and a neighboring network device is determined. In the context of the present disclosure, a neighboring network device can be a network device that has a direct link (i.e., one hop) with the network device.

Here, the node delay may include a packet processing delay, a packet queuing delay or the like, and can be determined in advance by experiment. The node delay can be preconfigured in the network device.

The link delay may be measured as a unidirectional delay from the network device to the neighboring network device, a unidirectional delay from the neighboring network device to the network device, or a bidirectional delay between the network device and the neighboring network device. In particular, the link delay can be measured using Precision Time Protocol (PTP). In an example, the link delay can be half of a round trip delay between the network device and the neighboring network device.

At block 320, an LLDPDU containing the node delay and/or the link delay is transmitted to the neighboring network device.

For example, the LLDPDU may include a first Type-Length-Value (TLV) indicating the node delay and/or a second TLV indicating the link delay. In particular, the first TLV may include a type or subtype field indicating that the first TLV is for node delay advertisement and a value field indicating a numerical value of the node delay. Additionally or alternatively, the second TLV may include a type or subtype field indicating that the second TLV is for link delay advertisement and a value field indicating a numerical value of the link delay. In an example, each of the first TLV and the second TLV may further include a unit field indicating a time unit of the numerical value in its value field.

Figure 4A:
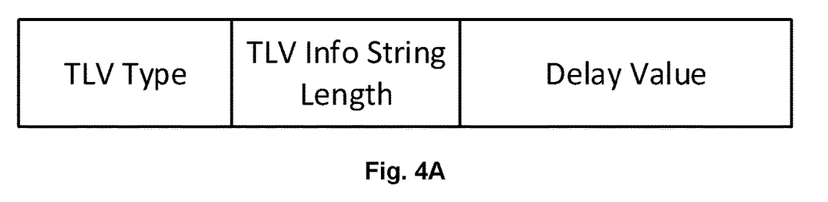
FIGS. 4A-4D are schematic diagrams showing TLV formats according to an embodiment of the present disclosure.
Figure 4B:
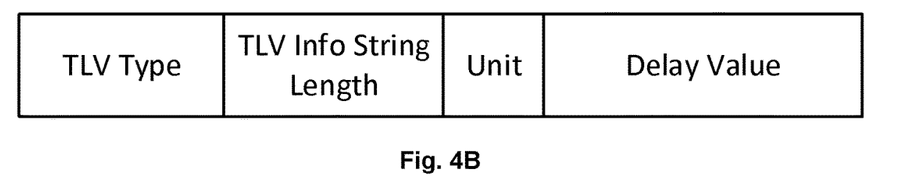
Figure 4C:
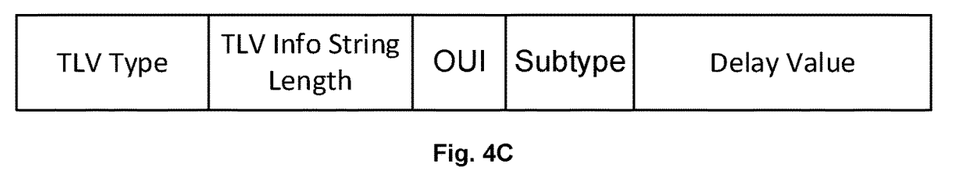
Figure 4D:
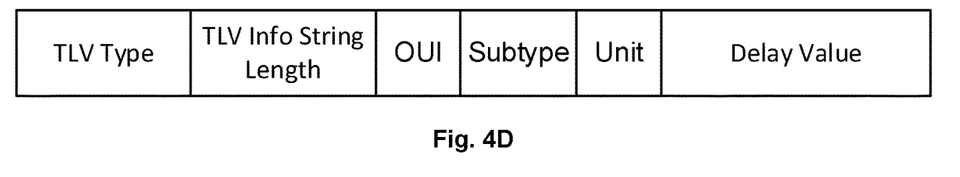

FIGS. 4A-4D show some examples of TLV formats that can be used for the first TLV and/or the second TLV. As shown in FIG. 4A, a TLV includes a TLV type field indicating that the TLV is for node delay advertisement or link delay advertisement, a TLV information string length field indicating a length of the following TLV information string, and the TLV information string including a delay value field indicating a numerical value of the node delay or link delay. In the format shown in FIG. 4A, the time unit of the numerical value in the delay value field, e.g., $\mu s$, can be derived from the TLV type field (in that sense the time unit is indicated implicitly by the TLV type field). The format shown in FIG. 4B differs from that shown in FIG. 4A in that the TLV information string further includes a unit field to explicitly indicate the time unit. FIG. 4C shows another TLV format including a TLV type field, a TLV information string length field and a TLV information string. The TLV information string in FIG. 4C includes an Organization Unique Identifier (OUI) field indicating an OUI assigned to a specific organization, a subtype field indicating that the TLV is for node delay advertisement or link delay advertisement, and a delay value field indicating a numerical value of the node delay or link delay. Here, the time unit of the numerical value in the delay value field, e.g., ps, can be derived from the subtype field (in that sense the time unit is indicated implicitly by the subtype field). The format shown in FIG. 4D differs from that shown in FIG. 4C in that the TLV information string further includes a unit field to explicitly indicate the time unit.

In an example, the method 300 can be applied in the network scenario shown in FIG. 1. Assuming that the method 300 is performed by the network device 112 of FIG. 1, without loss of generality, the network device 112 can transmit the LLDPDU containing the node delay and/or the link delay to the network device 111 in the block 310. The network device 112 can store the node delay and/or the link delay in its local LLDP database and transmit information on the node delay and/or the link delay to the control device 120. The control device 120 can query the information stored in the LLDP database at the network device 112 using SNMP or NETCONF. Accordingly, the information on the node delay and/or the link delay can be transmitted to the control device 120 in response to the query based on SNMP or NETCONF. Further, the network device 112 can receive from the network device 113 another LLDPDU containing another node delay associated with the network device 113 and/or another link delay associated with a link between the network device 112 and the network device 113. In this case, the network device 112 can store the other node delay and/or the other link delay in its local LLDP database, and transmit information on the other node delay and/or the other link delay to the control device 120. Similarly, the information on the other node delay and/or the other link delay can be transmitted to the control device 120 in response to a query based on SNMP or NETCONF.

Alternatively, the method 300 can be applied in the network scenario shown in FIG. 2. Assuming that the method 300 is performed by the network device 212 of FIG. 2, without loss of generality, the network device 212 can receive from the control device 220 a packet to be forwarded to the network device 212. The packet can be an OpenFlow packet and can have an embedded LLDPDU, as discussed above in connection with FIG. 2. The network device 212 can add the node delay and/or the link delay to the embedded LLDPDU to form the LLDPDU to be transmitted to e.g., the network device 211 in the block 310. Upon receiving the LLDPDU, the network device 211 can send a packet (e.g., an OpenFlow packet) having the LLDPDU embedded to the control device 220. In this way, in addition to the topology information as discussed above in connection with FIG. 2, the delay information (i.e., the node delay and/or link delay) can also be transmitted to the control device 220.

Figure 5:
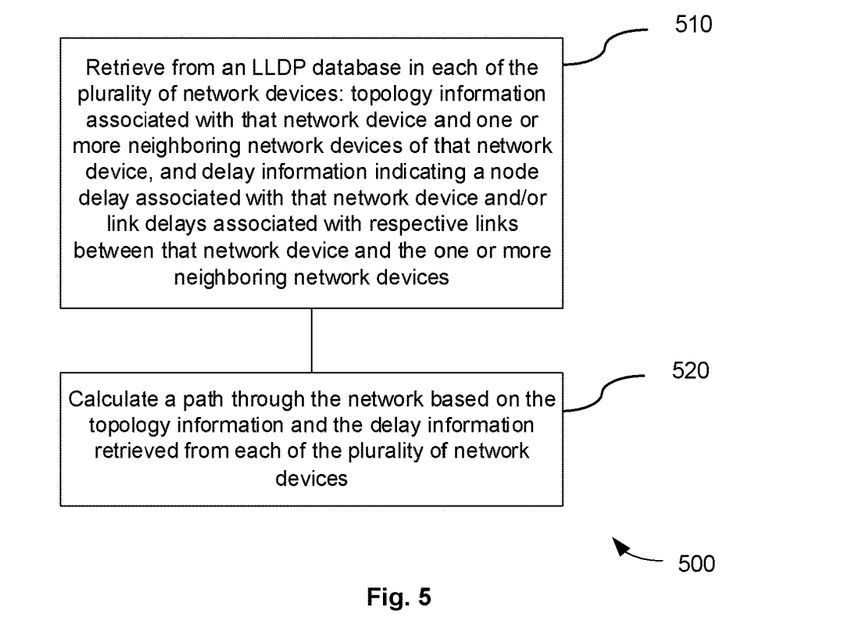
FIG. 5 is a flowchart illustrating a method in a control device according to an embodiment of the present disclosure.

FIG. 5 is a flowchart illustrating a method 500 according to an embodiment of the present disclosure. The method 500 can be performed at a control device of a network including a plurality of network devices, e.g., the control device 120 in FIG. 1. The network may operate based on Ethernet.

At block 510, the control device retrieves from an LLDP database in each of the plurality of network devices: i) topology information associated with that network device and one or more neighboring network devices of that network device and ii) delay information indicating a node delay associated with that network device and/or link delays associated with respective links between that network device and the one or more neighboring network devices.

Here, the topology information in the LLDP database in each network device can be obtained as described above in connection with FIG. 1, and the delay information in the LLDP database in each network device can be obtained as described above in connection with FIG. 3.

In an example, the control device may host an NMS and the topology information and the delay information may be retrieved from each of the plurality of network devices based on SNMP or NETCONF.

At block 520, a path through the network is calculated based on the topology information and the delay information retrieved from each of the plurality of network devices.

Here, the path can be calculated such that it satisfies a delay requirement. In the example shown in FIG. 1, it is assumed that the delay introduced by the link between the host 101 and the network device 111 and the delay introduced by the link between the host 102 and the network device 113 are negligible, the node delay associated with the network devices 111, 112 and 113 are 4 μs, 5 μs and 8 μs, respectively, the link between the network devices 111 and 112 has a link delay of 3 μs, the link between the network devices 112 and 113 has a link delay of 2 μs and the link between the network devices 111 and 113 has a link delay of 20 μs (assuming that each link delay here is half of a round trip delay over a link for simplicity). In this case, Path 1 from the host 101, through the network devices 111, 112 and 113, to the host 102 will have a total delay of 4+3+5+2+8=22 μs, and Path 2 from host 101, through the network devices 111 and 113, to the host 102 will have a total delay of 4+20+ 8=32 μs. When the delay requirement is e.g., 25 μs, Path 1 will be selected.

Figure 6:
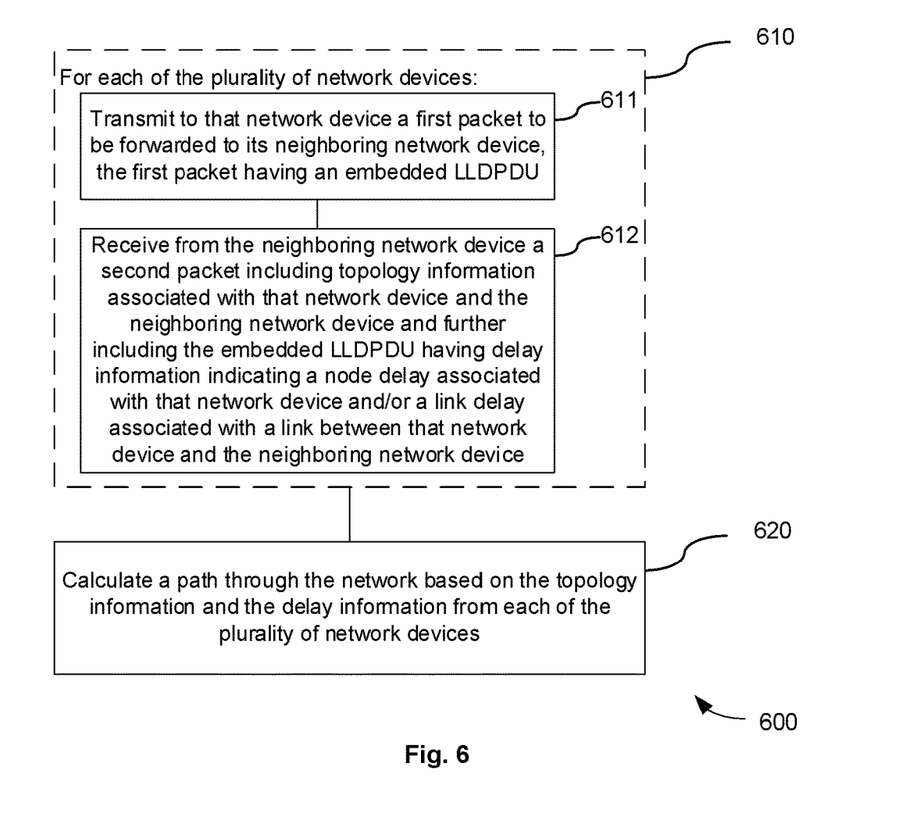
FIG. 6 is a flowchart illustrating a method in a control device according to another embodiment of the present disclosure.

FIG. 6 is a flowchart illustrating a method 600 according to an embodiment of the present disclosure. The method 600 can be performed at a control device of a network including a plurality of network devices, e.g., the control device 220 in FIG. 2. The network may operate based on Ethernet. The control device may host an SDN controller.

At block 610, for each of the plurality of network devices, the control device transmits 611 to that network device a first packet to be forwarded to its neighboring network device, the first packet having an embedded LLDPDU, and receives 612 from the neighboring network device a second packet including topology information associated with that network device and the neighboring network device and further including the embedded LLDPDU having delay information indicating a node delay associated with that network device and/or a link delay associated with a link between that network device and the neighboring network device. For the details of the node delay and/or the link delay, reference can be made to the method 300 as described above in connection with FIG. 3.

At block 620, a path through the network is calculated based on the topology information and the delay information from each of the plurality of network devices.

Here, the path can be calculated such that it satisfies a delay requirement. The example of path calculation as described above in connection with FIG. 5 also applies here.

Figure 7:
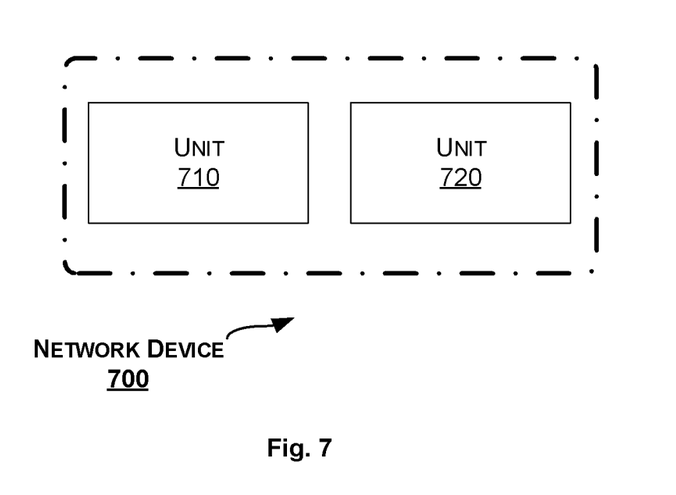
FIG. 7 is a block diagram of a network device according to an embodiment of the present disclosure.

Correspondingly to the method 300 as described above, a network device is provided. FIG. 7 is a block diagram of a network device 700 according to an embodiment of the present disclosure. The network device 700 can be e.g., the network device 111, 112 or 113 in FIG. 1 or the network device 211, 212 or 213 in FIG. 2.

As shown in FIG. 7, the network device 700 includes a determining unit 710 configured to determine a node delay associated with the network device and/or a link delay associated with a link between the network device and a neighboring network device. The network device 700 further includes a communication unit 720 configured to transmit to the neighboring network device a Link Layer Discovery Protocol Data Unit (LLDPDU) containing the node delay and/or the link delay.

In an embodiment, the determining unit 710 can be configured to measure the link delay as a unidirectional delay from the network device to the neighboring network device, a unidirectional delay from the neighboring network device to the network device, or a bidirectional delay between the network device and the neighboring network device.

In an embodiment, the link delay may be measured using Precision Time Protocol (PTP).

In an embodiment, the LLDPDU may include a first Type-Length-Value (TLV) indicating the node delay and/or a second TLV indicating the link delay.

In an embodiment, the first TLV may include a type or subtype field indicating that the first TLV is for node delay advertisement and a value field indicating a numerical value of the node delay, and/or the second TLV may include a type or subtype field indicating that the second TLV is for link delay advertisement and a value field indicating a numerical value of the link delay.

In an embodiment, each of the first TLV and the second TLV may further include a unit field indicating a time unit of the numerical value in its value field.

In an embodiment, the network device and the neighboring network device may operate based on Ethernet.

In an embodiment, the network device 700 can further include a storing unit configured to store the node delay and/or the link delay in an LLDP database at the network device. The communication unit 720 can be further configured to transmit information on the node delay and/or the link delay to a control device.

In an embodiment, the communication unit 720 can be further configured to receive from another neighboring network device another LLDPDU containing another node delay associated with the other neighboring network and/or another link delay associated with a link between the network device and the other neighboring network device. The storing unit can be further configured to store the other node delay and/or the other link delay in the LLDP database. The communication unit 720 can be further configured to transmit information on the other node delay and/or the other link delay to the control device.

In an embodiment, the control device may host a Network Management System (NMS) and the information on the node delay and/or the link delay and/or the information on the other node delay and/or the other link delay may be transmitted to the control device in response to a query based on Simple Network Management Protocol (SNMP) or NETwork CONFiguration (NETCONF).

In an embodiment, the communication unit 720 can be further configured to receive from a control device a packet to be forwarded to the neighboring network device, the first packet having an embedded LLDPDU; and add the node delay and/or the link delay to the embedded LLDPDU to form the LLDPDU.

In an embodiment, the packet may be an OpenFlow packet.

In an embodiment, the control device may host a Software-Defined Networking (SDN) controller.

The units 710~720 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 3.

Figure 8:
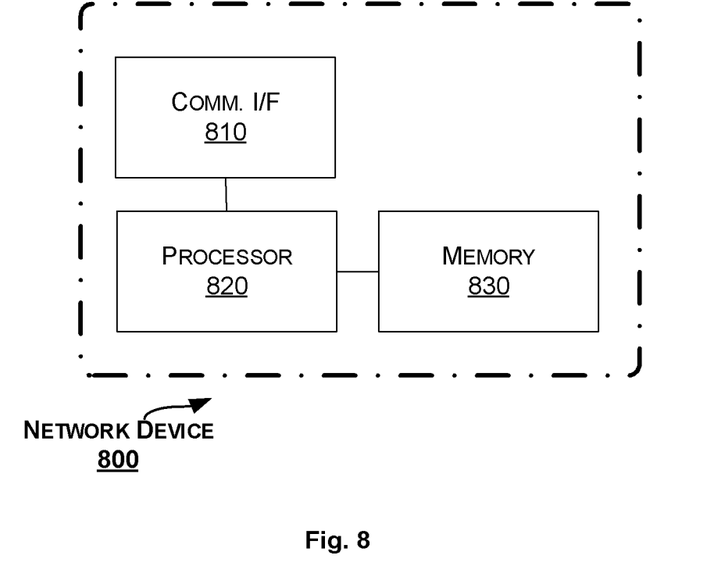
FIG. 8 is a block diagram of a network device according to another embodiment of the present disclosure.

FIG. 8 is a block diagram of a network device 800 according to another embodiment of the present disclosure. For example, the network device 800 can be e.g., the network device 111, 112 or 113 in FIG. 1 or the network device 211, 212 or 213 in FIG. 2. The network device 800 includes a communication interface 810, a processor 820 and a memory 830. The memory 830 contains instructions executable by the processor 820 whereby the network device 800 is operative to perform the actions, e.g., of the procedure described earlier in conjunction with FIG. 3.

Particularly, the memory 830 contains instructions executable by the processor 820 whereby the network device 800 is operative to: determine a node delay associated with the network device and/or a link delay associated with a link between the network device and a neighboring network device; and transmit to the neighboring network device a Link Layer Discovery Protocol Data Unit (LLDPDU) containing the node delay and/or the link delay.

In an embodiment, the operation of determining the link delay may include measuring the link delay as a unidirectional delay from the network device to the neighboring network device, a unidirectional delay from the neighboring network device to the network device, or a bidirectional delay between the network device and the neighboring network device.

In an embodiment, the link delay may be measured using Precision Time Protocol (PTP).

In an embodiment, the LLDPDU may include a first Type-Length-Value (TLV) indicating the node delay and/or a second TLV indicating the link delay.

In an embodiment, the first TLV may include a type or subtype field indicating that the first TLV is for node delay advertisement and a value field indicating a numerical value of the node delay, and/or the second TLV may include a type or subtype field indicating that the second TLV is for link delay advertisement and a value field indicating a numerical value of the link delay.

In an embodiment, each of the first TLV and the second TLV may further include a unit field indicating a time unit of the numerical value in its value field.

In an embodiment, the network device and the neighboring network device may operate based on Ethernet.

In an embodiment, the memory 830 may further contain instructions executable by the processor 820 whereby the network device 800 is operative to: store the node delay and/or the link delay in an LLDP database at the network device; and transmit information on the node delay and/or the link delay to a control device.

In an embodiment, the memory 830 may further contain instructions executable by the processor 820 whereby the network device 800 is operative to: receive from another neighboring network device another LLDPDU containing another node delay associated with the other neighboring network and/or another link delay associated with a link between the network device and the other neighboring network device; store the other node delay and/or the other link delay in the LLDP database; and transmit information on the other node delay and/or the other link delay to the control device.

In an embodiment, the control device may host a Network Management System (NMS) and the information on the node delay and/or the link delay and/or the information on the other node delay and/or the other link delay may be transmitted to the control device in response to a query based on Simple Network Management Protocol (SNMP) or NETwork CONFiguration (NETCONF).

In an embodiment, the memory 830 may further contain instructions executable by the processor 820 whereby the network device 800 is operative to: receive from a control device a packet to be forwarded to the neighboring network device, the first packet having an embedded LLDPDU; and add the node delay and/or the link delay to the embedded LLDPDU to form the LLDPDU.

In an embodiment, the packet may be an OpenFlow packet.

In an embodiment, the control device may host a Software-Defined Networking (SDN) controller.

Figure 9:
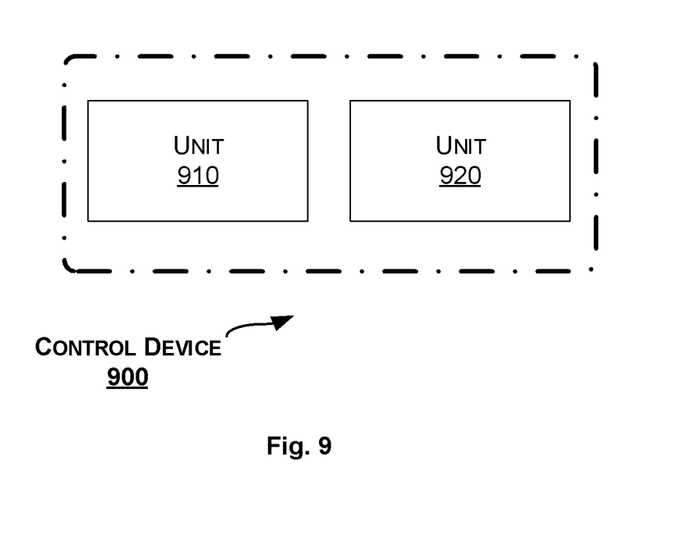
FIG. 9 is a block diagram of a control device according to an embodiment of the present disclosure.

Correspondingly to the method 500 or 600 as described above, a control device is provided. FIG. 9 is a block diagram of a control device 900 of a network including a plurality of network devices according to an embodiment of the present disclosure.

For example, the control device 900 can be the control device 120 in FIG. 1. The control device 900 includes a communication unit 910 configured to retrieve from a Link Layer Discovery Protocol (LLDP) database in each of the plurality of network devices: topology information associated with that network device and one or more neighboring network devices of that network device, and delay information indicating a node delay associated with that network device and/or link delays associated with respective links between that network device and the one or more neighboring network devices. The control device 900 further includes a path calculation unit 920 configured to calculate a path through the network based on the topology information and the delay information retrieved from each of the plurality of network devices.

In an embodiment, the path may be calculated such that it satisfies a delay requirement.

In an embodiment, the control device 900 may host a Network Management System (NMS) and the topology information and the delay information may be retrieved from each of the plurality of network devices based on Simple Network Management Protocol (SNMP) or NETwork CONFiguration (NETCONF).

In an embodiment, the network may operate based on Ethernet.

Alternatively, the control device 900 can be the control device 220 in FIG. 2. The control device 900 includes a communication unit 910 configured to, for each of the plurality of network devices: transmit to that network device a first packet to be forwarded to its neighboring network device, the first packet having an embedded Link Layer Discovery Protocol Data Unit (LLDPDU); and receive from the neighboring network device a second packet including topology information associated with that network device and the neighboring network device and further including the embedded LLDPDU having delay information indicating a node delay associated with that network device and/or a link delay associated with a link between that network device and the neighboring network device. The control device 900 further includes a path calculation unit 920 configured to calculate a path through the network based on the topology information and the delay information from each of the plurality of network devices.

In an embodiment, the path may be calculated such that it satisfies a delay requirement.

In an embodiment, the control device may host a Software-Defined Networking (SDN) controller.

In an embodiment, the network may operate based on Ethernet.

The units 910~920 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 5 or 6.

Figure 10:
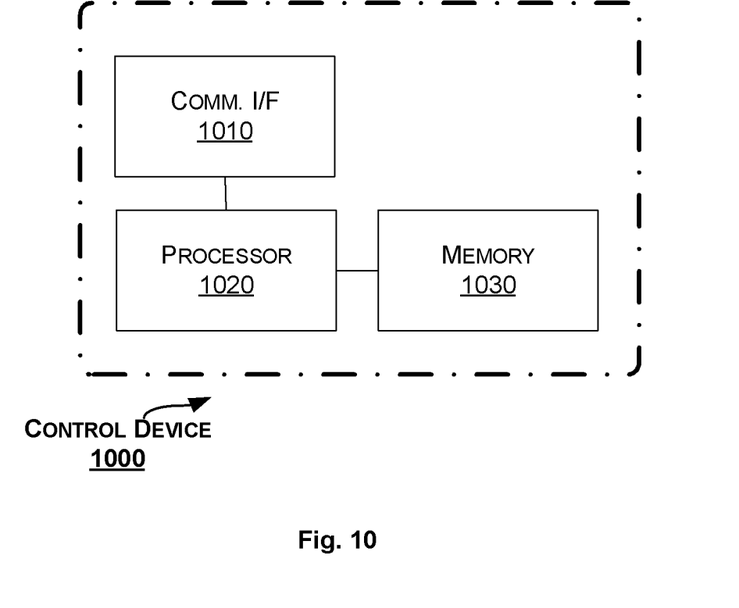
FIG. 10 is a block diagram of a control device according to another embodiment of the present disclosure.

FIG. 10 is a block diagram of a control device 1000 according to another embodiment of the present disclosure. The control device 1000 includes a communication interface 1010, a processor 1020 and a memory 1030. The memory 1030 contains instructions executable by the processor 1020 whereby the control device 1000 is operative to perform the actions, e.g., of the procedure described earlier in conjunction with FIG. 5 or 6.

For example, the control device 1000 can be the control device 120 in FIG. 1. Particularly, the memory 1030 contains instructions executable by the processor 1020 whereby the control device 1000 is operative to: retrieve from a Link Layer Discovery Protocol (LLDP) database in each of the plurality of network devices: topology information associated with that network device and one or more neighboring network devices of that network device, and delay information indicating a node delay associated with that network device and/or link delays associated with respective links between that network device and the one or more neighboring network devices; and calculate a path through the network based on the topology information and the delay information retrieved from each of the plurality of network devices.

In an embodiment, the path may be calculated such that it satisfies a delay requirement.

In an embodiment, the control device may host a Network Management System (NMS) and the topology information and the delay information may be retrieved from each of the plurality of network devices based on Simple Network Management Protocol (SNMP) or NETwork CONFiguration (NETCONF).

In an embodiment, the network may operate based on Ethernet.

Alternatively, the control device 1000 can be the control device 220 in FIG. 2. Particularly, the memory 1030 contains instructions executable by the processor 1020 whereby the control device 1000 is operative to: for each of the plurality of network devices: transmit to that network device a first packet to be forwarded to its neighboring network device, the first packet having an embedded Link Layer Discovery Protocol Data Unit (LLDPDU); and receive from the neighboring network device a second packet including topology information associated with that network device and the neighboring network device and further including the embedded LLDPDU having delay information indicating a node delay associated with that network device and/or a link delay associated with a link between that network device and the neighboring network device; and calculate a path through the network based on the topology information and the delay information from each of the plurality of network devices.

In an embodiment, the path may be calculated such that it satisfies a delay requirement.

In an embodiment, the control device may host a Software-Defined Networking (SDN) controller.

In an embodiment, the network may operate based on Ethernet.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 820 cause the network device 800 to perform the actions, e.g., of the procedure described earlier in conjunction with FIG. 3, or code/computer readable instructions, which when executed by the processor 1020 cause the control device 1000 to perform the actions, e.g., of the procedure described earlier in conjunction with FIG. 5 or 6.

The computer program product may be configured as a computer program code structured in computer program modules. The computer program modules could essentially perform the actions of the flow illustrated in FIG. 3, 5 or 6.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network device, comprising:
  receiving, from a control device, a packet to be forwarded to a neighboring network device, the packet having an embedded Link Layer Discovery Protocol Data Unit, LLDPDU;
  determining a node delay associated with the network device and a link delay associated with a link between the network device and the neighboring network device, wherein the network device and the neighboring network device are on an Ethernet based network;
  adding the node delay and the link delay to the embedded LLDPDU to form the LLDPDU; and
  transmitting, to the neighboring network device, the LLDPDU containing the node delay and the link delay, an identifier of the network device, and a port associated with the node delay and the link delay.

2. The method of claim 1, wherein the determining includes determining the link delay associated with the link between the network device and the neighboring network device and said determining the link delay comprises measuring the link delay as a unidirectional delay from the network device to the neighboring network device, a unidirectional delay from the neighboring network device to the network device, or a bidirectional delay between the network device and the neighboring network device.

3. The method of claim 2, wherein the link delay is measured using Precision Time Protocol, PTP.

4. The method of claim 1, wherein the LLDPDU comprises a first Type-Length-Value, TLV, indicating the node delay and a second TLV indicating the link delay.

5. The method of claim 4, wherein:
  the first TLV comprises a type or subtype field indicating that the first TLV is for node delay advertisement and a value field indicating a numerical value of the node delay; and
  the second TLV comprises a type or subtype field indicating that the second TLV is for link delay advertisement and a value field indicating a numerical value of the link delay.

6. The method of claim 5, wherein each of the first TLV and the second TLV further comprises a unit field indicating a time unit of the numerical value in its value field.

7. The method of claim 1, wherein the network device and the neighboring network device operate based on Ethernet.

8. The method of claim 1, further comprising:
  storing the node delay and the link delay in a Link Layer Discovery Protocol, LLDP, database at the network device; and
  transmitting information on the node delay and the link delay to the control device.

9. The method of claim 8, further comprising:
  receiving, from another neighboring network device, another LLDPDU containing another node delay associated with the other neighboring network device and another link delay associated with a link between the network device and the other neighboring network device;
  storing the other node delay and the other link delay in the LLDP database; and
  transmitting information on the other node delay and the other link delay to the control device.

10. The method of claim 9, wherein the control device hosts a Network Management System, NMS, and the information on the node delay and the link delay and the information on the other node delay and the other link delay are transmitted to the control device in response to a query based on Simple Network Management Protocol, SNMP, or NETwork CONFiguration, NETCONF.

11. The method of claim 1, wherein the control device hosts a Software-Defined Networking, SDN, controller.

* * * * *